United States Patent [19]
Michael et al.

[11] Patent Number: 6,141,033
[45] Date of Patent: Oct. 31, 2000

[54] BANDWIDTH REDUCTION OF MULTICHANNEL IMAGES FOR MACHINE VISION

[75] Inventors: David J. Michael, Framingham, Mass.; Philip B. Romanik, West Haven, Conn.

[73] Assignee: Cognex Corporation, Natick, Mass.

[21] Appl. No.: 08/856,920

[22] Filed: May 15, 1997

[51] Int. Cl.$^7$ ........................................................ H04N 5/14
[52] U.S. Cl. ............................ 348/25; 348/255; 348/384; 382/144
[58] Field of Search ................................ 348/25, 87, 384, 348/390; 382/141, 144, 145, 146, 147, 148, 149, 232, 235, 169, 209, 151, 302

[56] References Cited

U.S. PATENT DOCUMENTS

| | | |
|---|---|---|
| 3,816,722 | 6/1974 | Sakoe et al. . |
| 3,936,800 | 2/1976 | Ejiri et al. . |

(List continued on next page.)

FOREIGN PATENT DOCUMENTS

| | | |
|---|---|---|
| 0 527 632 A2 | 2/1993 | European Pat. Off. . |
| WO 95/122137 | 8/1995 | WIPO . |
| WO 95/21376 | 8/1995 | WIPO . |
| WO 97/21189 | 6/1997 | WIPO . |
| WO 97/22858 | 6/1997 | WIPO . |
| WO 97/24692 | 7/1997 | WIPO . |
| WO 97/24693 | 7/1997 | WIPO . |

OTHER PUBLICATIONS

Grimson, W. Eric. L. and Huttenlocher, Daniel P., "On the Sensitivity of the Hough Transform for Object Recognition", May 1990, IEEE Transactions on Pattern Analysis and Machine Intelligence, vol. 12, No. 3.

Medina–Mora et al. (1981) An Incremental Programming Environment, IEEE Transactions on Software Eng. SE–7:472–482.

Teitelbaum et al. (19810 The Cornell Program Synthesizer: A Syntax–Directed Programming Environment, Communications of the ACM 24:563–573.

Newsletter from Acquity Imaging, Inc., "Remote Vision Support Package—The Phones Are Ringing!," 1 page.

PictureTel Corporation Product Brochure "Picturetel Live PCS 100(tm) Personal Visual Communications System," 3 pp. (1993).

PictureTel Corporation Product Brochure, "Picturetel System 1000: Complete Videoconferencing for Cost Sensitive Applications," 4 pp. (1993).

PictureTel Corporation Product Brochure, "Picturetel System 4000(tm) A Family of Models to Fit Your Application From Offices to Boardrooms, Classrooms, and Auditoriums," 4 pp. (1993).

(List continued on next page.)

Primary Examiner—Chris S. Kelley
Assistant Examiner—Gims Philippe
Attorney, Agent, or Firm—David J. Powsner; Russ Weinzimmer

[57] ABSTRACT

The invention provides methods and apparatus for reducing the bandwidth of a multichannel image. In one aspect, the methods and apparatus call for acquiring a multichannel training image representing a training scene. Weighting factors for the respective channels are determined based on the contrast at corresponding locations in that multichannel training image. A reduced bandwidth runtime image is generated from the multichannel runtime images as a function of (i) the weighting factors determined from the training image and (ii) a multichannel image representing the runtime scene.

34 Claims, 6 Drawing Sheets

U.S. PATENT DOCUMENTS

| | | |
|---|---|---|
| 3,967,100 | 6/1976 | Shimomura . |
| 3,968,475 | 7/1976 | McMahon . |
| 3,978,326 | 8/1976 | Shimomura . |
| 4,011,403 | 3/1977 | Epstein et al. . |
| 4,115,702 | 9/1978 | Nopper . |
| 4,115,762 | 9/1978 | Akiyama et al. . |
| 4,183,013 | 1/1980 | Agrawala et al. . |
| 4,200,861 | 4/1980 | Hubach et al. . |
| 4,254,400 | 3/1981 | Yoda et al. . |
| 4,300,164 | 11/1981 | Sacks . |
| 4,385,322 | 5/1983 | Hubach et al. . |
| 4,441,124 | 4/1984 | Heebner et al. . |
| 4,441,206 | 4/1984 | Kuniyoshi et al. . |
| 4,445,137 | 4/1984 | Panofsky ............................... 382/302 |
| 4,534,813 | 8/1985 | Williamson et al. . |
| 4,541,116 | 9/1985 | Lougheed . |
| 4,570,180 | 2/1986 | Baier et al. . |
| 4,577,344 | 3/1986 | Warren et al. . |
| 4,581,762 | 4/1986 | Lapidus et al. . |
| 4,606,065 | 8/1986 | Beg et al. . |
| 4,617,619 | 10/1986 | Gehly . |
| 4,630,306 | 12/1986 | West et al. . |
| 4,688,088 | 8/1987 | Hamazaki et al. . |
| 4,706,168 | 11/1987 | Weisner . |
| 4,728,195 | 3/1988 | Silver . |
| 4,730,260 | 3/1988 | Mori et al. . |
| 4,731,858 | 3/1988 | Grasmueller et al. . |
| 4,736,437 | 4/1988 | Sacks et al. . |
| 4,742,551 | 5/1988 | Deering . |
| 4,764,870 | 8/1988 | Haskin . |
| 4,771,469 | 9/1988 | Wittenburg . |
| 4,783,826 | 11/1988 | Koso . |
| 4,783,828 | 11/1988 | Sadjadi . |
| 4,783,829 | 11/1988 | Miyakawa et al. . |
| 4,831,580 | 5/1989 | Yamada . |
| 4,860,374 | 8/1989 | Murakami et al. . |
| 4,860,375 | 8/1989 | McCubbrey et al. . |
| 4,876,457 | 10/1989 | Bose . |
| 4,876,728 | 10/1989 | Roth . |
| 4,903,218 | 2/1990 | Longo et al. . |
| 4,907,169 | 3/1990 | Lovoi . |
| 4,914,553 | 4/1990 | Hamada et al. . |
| 4,922,543 | 5/1990 | Ahlbom et al. . |
| 4,926,492 | 5/1990 | Tanaka et al. . |
| 4,932,065 | 6/1990 | Feldgajer . |
| 4,953,224 | 8/1990 | Ichinose et al. . |
| 4,955,062 | 9/1990 | Terui . |
| 4,959,898 | 10/1990 | Landman et al. . |
| 4,962,423 | 10/1990 | Yamada et al. . |
| 4,972,359 | 11/1990 | Silver et al. . |
| 4,982,438 | 1/1991 | Usami et al. . |
| 5,012,402 | 4/1991 | Akiyama . |
| 5,046,190 | 9/1991 | Daniel et al. . |
| 5,054,096 | 10/1991 | Beizer . |
| 5,060,276 | 10/1991 | Morris et al. . |
| 5,063,608 | 11/1991 | Siegel . |
| 5,073,958 | 12/1991 | Imme . |
| 5,081,656 | 1/1992 | Baker et al. . |
| 5,081,689 | 1/1992 | Meyer et al. . |
| 5,086,478 | 2/1992 | Kelly-Mahaffey et al. . |
| 5,090,576 | 2/1992 | Menten . |
| 5,091,861 | 2/1992 | Geller et al. . |
| 5,091,968 | 2/1992 | Higgins et al. . |
| 5,093,867 | 3/1992 | Hori et al. . |
| 5,113,565 | 5/1992 | Cipolla et al. . |
| 5,115,309 | 5/1992 | Hang . |
| 5,119,435 | 6/1992 | Berkin . |
| 5,124,622 | 6/1992 | Kawamura et al. . |
| 5,133,022 | 7/1992 | Weideman . |
| 5,134,575 | 7/1992 | Takagi . |
| 5,143,436 | 9/1992 | Baylor et al. . |
| 5,145,432 | 9/1992 | Midland et al. . |
| 5,151,951 | 9/1992 | Ueda et al. . |
| 5,153,925 | 10/1992 | Tanioka et al. . |
| 5,159,281 | 10/1992 | Hedstrom et al. . |
| 5,159,645 | 10/1992 | Kumagai . |
| 5,164,994 | 11/1992 | Bushroe . |
| 5,168,269 | 12/1992 | Harlan . |
| 5,185,855 | 2/1993 | Kato et al. . |
| 5,189,712 | 2/1993 | Kajiwara et al. . |
| 5,206,820 | 4/1993 | Ammann et al. . |
| 5,216,503 | 6/1993 | Paik . |
| 5,225,940 | 7/1993 | Ishii et al. . |
| 5,230,027 | 7/1993 | Kikuchi . |
| 5,243,607 | 9/1993 | Masson et al. . |
| 5,253,306 | 10/1993 | Nishio . |
| 5,253,308 | 10/1993 | Johnson . |
| 5,265,173 | 11/1993 | Griffin et al. . |
| 5,271,068 | 12/1993 | Ueda et al. . |
| 5,287,449 | 2/1994 | Kojima . |
| 5,297,256 | 3/1994 | Wolstenholme et al. . |
| 5,299,269 | 3/1994 | Gaborski et al. . |
| 5,311,598 | 5/1994 | Bose et al. . |
| 5,315,388 | 5/1994 | Shen et al. . |
| 5,319,457 | 6/1994 | Nakahashi et al. . |
| 5,327,156 | 7/1994 | Masukane et al. . |
| 5,337,267 | 8/1994 | Colavin . |
| 5,363,507 | 11/1994 | Nakayama et al. . |
| 5,367,439 | 11/1994 | Mayer et al. . |
| 5,367,667 | 11/1994 | Wahlquist et al. . |
| 5,371,690 | 12/1994 | Engel et al. . |
| 5,388,197 | 2/1995 | Rayner . |
| 5,388,252 | 2/1995 | Dreste et al. . |
| 5,398,292 | 3/1995 | Aoyama . |
| 5,432,525 | 7/1995 | Maruo et al. . |
| 5,440,699 | 8/1995 | Farrand et al. . |
| 5,455,870 | 10/1995 | Sepai et al. . |
| 5,455,933 | 10/1995 | Schieve et al. . |
| 5,475,766 | 12/1995 | Tsuchiya et al. . |
| 5,477,138 | 12/1995 | Efjavic et al. . |
| 5,481,712 | 1/1996 | Silver et al. . |
| 5,485,570 | 1/1996 | Bushboom et al. . |
| 5,491,780 | 2/1996 | Fyles et al. . |
| 5,495,424 | 2/1996 | Tokura . |
| 5,495,537 | 2/1996 | Bedrosian et al. ....................... 382/209 |
| 5,496,106 | 3/1996 | Anderson ................................ 348/255 |
| 5,502,775 | 3/1996 | Takeo ..................................... 382/169 |
| 5,519,840 | 5/1996 | Matias et al. . |
| 5,526,050 | 6/1996 | King et al. . |
| 5,532,739 | 7/1996 | Garakani et al. . |
| 5,550,763 | 8/1996 | Michael . |
| 5,550,888 | 8/1996 | Neitzel et al. ......................... 378/98.7 |
| 5,566,877 | 10/1996 | McCormack . |
| 5,568,563 | 10/1996 | Tanaka et al. . |
| 5,574,668 | 11/1996 | Beaty . |
| 5,574,801 | 11/1996 | Collet-Beillon . |
| 5,583,949 | 12/1996 | Smith et al. . |
| 5,583,954 | 12/1996 | Garakani . |
| 5,592,562 | 1/1997 | Rooks . |
| 5,594,859 | 1/1997 | Palmer et al. . |
| 5,602,937 | 2/1997 | Bedrosian et al. ....................... 382/151 |
| 5,608,872 | 3/1997 | Schwartz et al. . |
| 5,619,265 | 4/1997 | Suzuki et al. ........................... 348/384 |
| 5,640,199 | 6/1997 | Garakani et al. . |
| 5,640,200 | 6/1997 | Michael . |
| 5,640,539 | 6/1997 | Goishi et al. ........................... 382/144 |

OTHER PUBLICATIONS

Symantec Corporation, "The Norton pcAnywhere User's Guide," Table of Contents 8 pp; Introduction of pcAnywhere Technology pp i–vii; Chapter 7—Sessions; pp. 191–240 (1991).

Bursky, Dave, "CMOS Four–Chip Set Process Images at 20–MHz Data Rates," Electronic Design, May 28, 1987, pp. 39–44.

Plessey Semiconductors, Preliminary Information, May 1986, Publication No. PS2067, May 1986, pp. 1–5.

NEC Electronics Inc., PD7281 Image Pipelined Processor, Product Information Brochure, pp. 2–169–2–211.

Horn, Berthold Klaus Paul. "Robot Vision", The Massachusetts Institute for Technology, 1986.

Rosenfeld, Azriel. "Computer Vision: Basic Principles," Proceedings of the IEEE. vol. 76, No. 8, Aug. 1988. pp. 863–868.

David W. Capson and Sai–kit Eng, "A Tiered–Color Illumination Approach for Machine Inspection of Solder Joints", IEEE Transactions on Pattern Analysis and Machine Intelligence, vol. 10, No. 3, May 1998, pp. 387–393.

Figure 6a
Front View

Figure 6b
Back View

BANDWIDTH REDUCTION OF MULTICHANNEL IMAGES FOR MACHINE VISION

RESERVATION OF COPYRIGHT

The disclosure of this patent document contains material which is subject to copyright protection. The owner thereof has no objection to facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The invention pertains to machine vision and, more particularly, to methods for bandwidth reduction of multichannel images. The invention has application, for example, in facilitating machine vision analysis of color images.

Machine vision refers to the automated determination of characteristics of objects and other features shown in an image. It is often employed in automated manufacturing lines, where images of components are analyzed to determine placement and alignment prior to assembly. Machine vision is also used for quality assurance. For example, in the semiconductor electronics assembly industry, images of chips are analyzed to insure that leads, solder paste and other components do not overrun designated boundaries.

Machine vision has traditionally been performed on gray-scale images, rather than color images. Gray-scale images acquired of components on an electrical equipment assembly are typically processed using gray-scale machine vision "tools," i.e., software routines, that determine component orientation and location. Gray-scale processing has been justified on a number of grounds, including the relatively low cost of gray-scale cameras and minimal computational demands of gray-scale vision tools.

Color video cameras are gradually replacing gray-scale cameras as conventional image acquisition devices. Though potentially increasing the flexibility of machine vision systems, the processing of color images can be problematic. Color video cameras generate digitally-encoded images in which each pixel is rendered in not one, but multiple, spectral bands. In a conventional RGB (red, green, blue) color video signal, for example, each image is represented by three monochromatic (or gray-scale) images: one based on the red portion of the spectrum, one based on the green portion of the spectrum, and based on the blue portion of the spectrum. A scene represented by a "color" image is typically reconstructed by aligning and adding together the corresponding red, green and blue image components.

A color image is an example of a "multichannel" image. More generally, a multichannel image is an image that is made up of two or more images (which may be referred to as component images, or sub-images) each representing a respective (albeit, possibly overlapping) spectral component of a scene. For example, as described above, an RGB color image is made up red, green and blue component (or sub-) images. The pixels in each of those component images represent the intensities of the respective spectral band (i.e., pixels in the red component image represent the intensities of the "reds" that make up the scene, pixels in the green component image represent the intensities of the "greens" that make up the scene, and pixels in the blue component image represent the intensities of the "blues" that make up the scene). Of course, multichannel images—as used in this application—are not merely limited to the traditional red, green and blue spectral bands but may include additional or other spectral bands in the visible, infrared, ultraviolet, x-ray or other portions of the electromagnetic spectrum.

Many machine vision systems can not process multichannel images because, as discussed above, their vision tools are designed for processing, at a given time, only a single gray-scale image—not sets of gray-scale images (i.e., multichannel images). One prior art technique for overcoming this requires using the vision tools to process separately each channel of the multichannel image (e.g., color image). The results are combined to produce a composite answer. One drawback of this technique is that it greatly increases, i.e., by three-fold, the computation required to process an image. Another drawback is that it can adversely affect the contrast among features shown in the image.

An object of this invention is provide improved methods for machine vision and, particularly, for reducing the bandwidth of a multichannel image. As used herein, "bandwidth" refers to the number of channels, range of values, and/or range of frequencies necessary to represent an image, e.g., for transmission, processing or storage. For example, the bandwidth of a digitally-encoded image is the number of bits necessary to encode the intensities and/or colors of the underlying scene, i.e., eight bits in the case of a conventional gray-scale image and twenty-four bits in the case of a conventional RGB color image. Thus, as used herein, reducing the bandwidth of a color image refers, for example, to reducing the number of bits necessary to transmit, store and/or process a digital signal representing the underlying scene.

Another object of the invention is to provide such methods as can be used for permitting multichannel images to be processed with gray-scale machine vision tools.

Still another object of the invention is to provide such methods as can be used to reduce the bandwidth of multichannel images without adversely affecting useful information contained therein.

Yet still another object of the invention is to provide such methods as can be implemented on conventional digital data processors or other conventional machine vision analysis equipment.

Yet a further object of the invention is to provide such methods as can be implemented computationally, optically or otherwise.

SUMMARY OF THE INVENTION

The foregoing objects are among those met by the invention which provides machine vision methods for reducing the bandwidth of multichannel images, e.g., based on contrasts in selected locations of a training image.

In one aspect of the invention, the method calls for inputting a multichannel training image, where each channel represents a respective (albeit, possibly overlapping) spectral band of the image. The method identifies, e.g., via operator input or otherwise, one or more calibration locations in the image. The method determines weighting factors for each respective channel based on the contrast in that channel at a location corresponding to the calibration location. The weighting factors are then used to reduce the bandwidth of a runtime image, which may be the same as or different from the training image. Particularly, a reduced bandwidth runtime image signal is generated as a function of (i) the weighting factors determined from the training image and (ii) the multichannel runtime image signal. By generating the weighting factors based on contrast at selected locations in the training image, the invention permits the preservation, enhancement, or reduction of selected contrasts in the reduced bandwidth runtime image signal.

To illustrate, by way of example, the invention can be used to facilitate bandwidth reduction of color images in the automated assembly of printed circuit boards. Thus, a multichannel color image of a printed circuit board on a conveyor belt can be input as a training image. A region of the image showing an edge of the circuit board can be selected, e.g., by the operator, as a calibration location. Weighting factors can be determined from the contrasts contained in each of the red, blue and green channels of the color image signal at regions corresponding to the calibration location. A multichannel runtime image signal can be input, e.g., showing several boards on a conveyor belt. That signal can be converted to a single-channel, gray-scale image by multiplying each of the channels by its weighting factor and summing the results. The resulting gray-scale signal can then be processed using conventional, gray-scale machine vision tools.

Yet another aspect of the invention provides a method as described above in which the weighting factors are generated so as to emphasize contrasts in the multichannel training signal at the calibration location. Continuing the example above, where the calibration location shows edge of the circuit board against the conveyor belt, the weighting factors can be generated to emphasize the color contrast between the board and the belt.

The invention provides, in still other aspects, methods as described above in which the reduced bandwidth image signal is generated as a linear function of a multichannel, e.g., in accord with the following relationship:

$$I_1 = k_1 C_1 + k_2 C_2 + \ldots k_n C_n$$

where, $I_1$ is the reduced bandwidth image signal;

$C_1$–$C_n$ are channels of the multichannel runtime image; and $k_1$–$k_n$ are weighting factors for channels $C_1$–$C_n$, as determined from the training image.

The weighting factors can themselves sum to a selected value, such as one, e.g., to normalize or to prevent overflow of the pixel values in the resulting reduced bandwidth image signal.

Still other aspects of the invention provide methods as described above in which multiple bandwidth reducing techniques are compared to determine which best emphasizes contrast at the calibration location in the training image. According to this aspect of the invention, a first reduced bandwidth signal is generated from the multichannel training signal as described above. A second reduced bandwidth signal is generated from that same multichannel signal using a different function, e.g., a hue function. Contrasts at the calibration location in the first and second reduced bandwidth signals are compared and, depending which is better, the corresponding function is used to generate reduced bandwidth signals from the runtime image.

In other aspects, the invention provides methods for optically reducing the bandwidth of images used in machine vision. According to one such aspect, the method calls for using a multichannel image acquisition device, e.g., a color video camera, to acquire a training image. As above, a calibration location is identified in that image and, from it, weighting factors are determined for each channel of the training image. An optical element is adjusted using those weighting factors to alter the spectral content of a runtime image. That spectral content-altered image is then acquired with a reduced-channel image acquisition device, e.g., a gray-scale video camera. The optical element can be, for example, an optical filter or an illumination source.

In other aspects, the invention provides improved methods of analyzing multichannel image signals with conventional gray-scale machine vision tools. The methods include determining a mapping function from a multichannel training image, and generating a reduced bandwidth runtime image signal by applying that mapping function to a multichannel runtime signal. That reduced bandwidth signal is, in turn, applied to the gray-scale machine vision tool for analysis.

In a related aspect, the invention provides a method as described above in which the step of generating a mapping function includes generating weighting factors, as described above.

In yet another related aspect, the invention provides methods as described above in which a lookup table is used in lieu of weighting factors. According to these aspects of the invention, a lookup table is generated as a function of the image values in one or more of the channels of the multichannel training signal. The reduced bandwidth runtime image signal is, in turn, generated as a function of image values in the multichannel runtime image and corresponding lookup table values.

In still other aspects, the invention provides apparatus operating in accord with the methodology above for reducing the bandwidth of multichannel images.

In yet still other aspects, the invention provides articles of manufacture embodying a computer program for causing a digital data processing apparatus to operate in accord with the methods above.

These and other aspects of the invention are evident in the drawings and in the description that follows.

The invention has wide application in industry and research applications. It permits the analysis of multichannel images using traditional gray-scale vision tools. Particularly, for example, the invention can be used to reduce the bandwidth of a twenty-four bit color image to eight bits, so that gray-scale search, gray-scale edge finding and other gray-scale vision tools can be applied in order to identify features in the image. Thus, for example, an existing vision system that is retrofit with a color video camera can be adapted, in accord with the teachings hereof, for analysis of images recorded by that camera without use of additional vision tools. Other aspects of the invention also permit the acquisition of improved gray-scale images from multichannel scenes.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
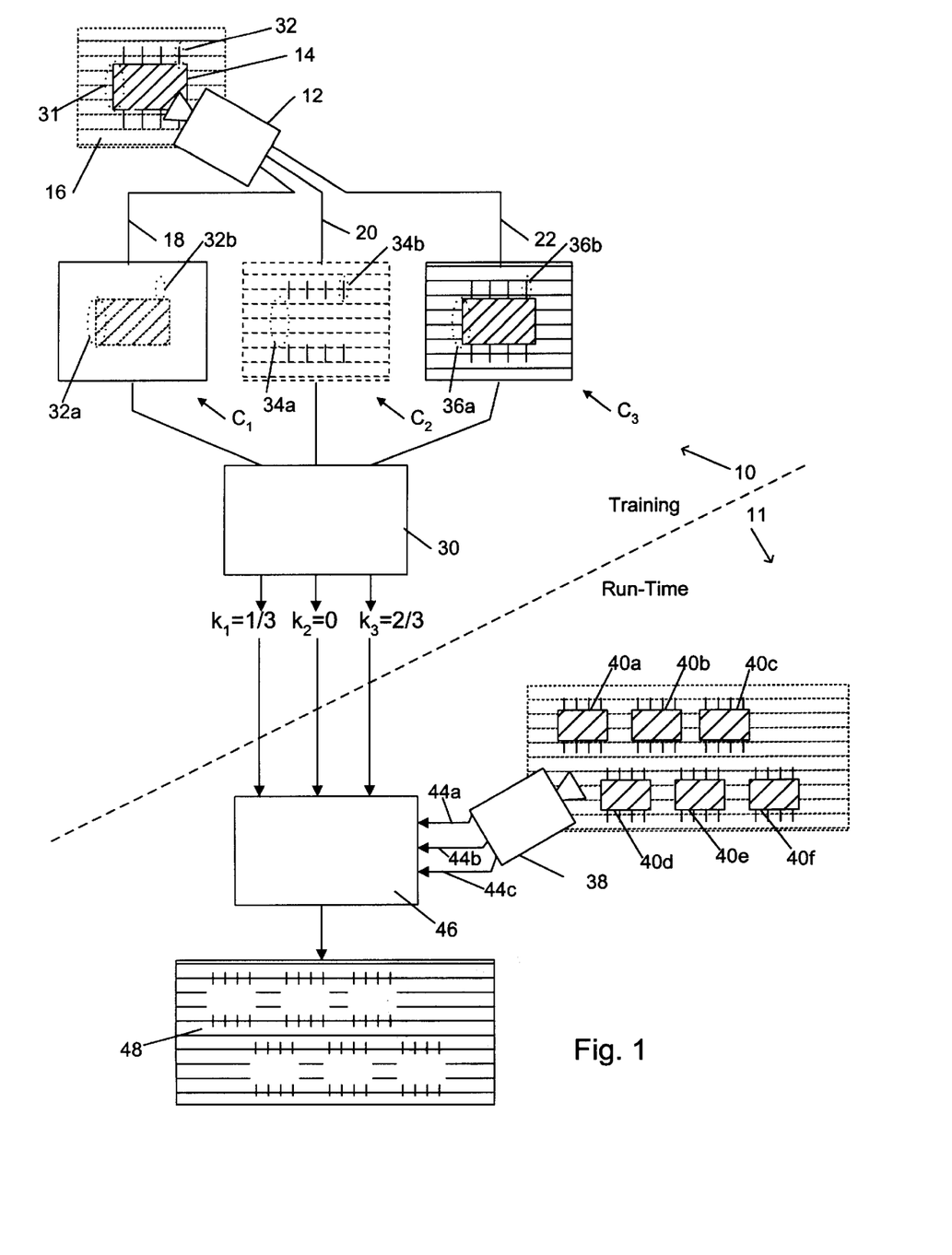
FIG. 1 depicts a processing-based machine vision system for bandwidth reduction according to one practice of the invention.

FIG. 1 depicts a machine vision system for bandwidth reduction according to one practice of the invention. The system includes a training section 10 that acquires a multi-channel training image and that generates weighting functions $k_i$ from that image. The system also includes a runtime section 11 that applies those weighting functions to multi-channel runtime images to reduce their bandwidth, e.g., so that they can be processed by gray-scale image processing equipment (not shown).

In the illustrated embodiment, the training section 10 has image acquisition device 12 that acquires, as the training image, a scene showing an electrical element 14 on a background 16, e.g., a printed circuit board. The device 12 generates a multichannel, multichannel "training" signal, representing that image, and outputs it on conductors 18, 20, 22. Those skilled in the art will, of course, appreciate that the multichannel signal need not be received over multiple separate conductors nor by way of multiple separate data streams. Rather, the multiple channels can be transmitted via a single conductor and/or encoded in a single data stream, e.g., as in the case of color images encoded in 24-bit data streams.

Those skilled in the art will appreciate that the training image may represent any scene from which the user desires to generate weighting factors. Typically, this will be an actual or artificial scene with contrasts (e.g., colors and intensities) representative of those to be altered or preserved in reducing the bandwidth of multichannel runtime images. For example, the illustrated training image is representative of contrasts between an electrical element and a printed circuit board and, hence, is used to generate weighting factors for reducing runtime color images bandwidth generated during printed circuit board assembly.

Each channel of the training signal represents a respective, possibly overlapping, spectral component of the training image. In the illustrated embodiment, for example, device 12 is conventional "RGB" color video camera. Accordingly, conductor 18 carries the red spectral components of the image; conductor 20, the green spectral components; and conductor 22, the blue spectral components. An image represented by each channel is referred to in the discussion that follows as a channel image, component image or sub-image, so as to distinguish it from the training image.

In the drawing, the channel images carried by conductors 18, 20, 22 are graphically depicted as images $C_1$, $C_2$, $C_3$. Those skilled in the art will appreciate that these channel images are not necessarily displayed during operation or execution of the invention. They are shown here to facilitate understanding of the invention.

In the illustration, the channel image $C_1$ on conductor 18 contains the red spectral components of the training image and emphasizes the body of the electrical element 14 against the background 16. Channel image $C_2$ on conductor 20 contains the green spectral components of the training image and emphasizes the leads of the electrical element 14 against the background 16. Channel image $C_3$ on conductor 22 contains the blue spectral components of the training image and emphasizes the background "against" the entire electrical element 14.

Those skilled in the art will appreciate that the invention is not limited to the use of three-channel color video image acquisition equipment. It may be used with any image acquisition device operating in the visual spectra, or otherwise, capable of generating two or more channels, each representing a respective—and, possibly, overlapping—spectral component of the scene. Such image acquisition equipment includes, by way of non-limiting example, charge-coupled devices, scanners, etc.

The channel images are routed via conductors 18, 20, 22 to image processing device 30 that generates weighting factors for each of the channels. That device may be a general purpose computer, vision processor (e.g., of the type available from the assignee hereof, Cognex Corporation), or special purpose computing device programmed, constructed and/or operated in accord with the teachings herein to generate weighting factors from the multichannel, multi-channel training signal.

In the illustrated embodiment, a weighting factor $k_i$ is generated for each respective channel of the training signal (and, as discussed below, of the runtime image signal) as a function of the contrast at a selected location, or locations, in the channel image represented by that signal. Thus, for example, a weighting factor $k_1$ is generated for channel 18 as a function of the contrast at locations 32a, 32b in channel image $C_1$; weighting factor $k_2$ is generated for channel 20 as a function of the contrast at location 34a, 34b in channel image $C_2$; weighting factor $k_3$ is generated for channel 22 as a function of the contrast at locations 36a, 36b in channel image $C_3$. These locations in the channel images correspond to calibration locations 31, 32 in the training image, as shown.

In the illustration, calibration locations 31, 32 denote regions in the multichannel training image that emphasize contrasts between the body of electrical element 14 and background 16, as well as between the leads of that electrical element and the background. The selection of such calibration locations may be appropriate, for example, in embodiments where the weighting factors are to be used to reduce runtime color images of printed circuit board assemblies to gray-scale images while, at the same time, preserving or enhancing contrasts between the electrical element 14 (and its leads) and the background 16.

Those skilled in the art will appreciate that greater or fewer calibration locations may be used. For example, in an embodiment where only the contrast between the background 16 and conductive leads of electrical element 14 body is of interest, location 32 alone can be selected. Still other locations may be selected so as to generate weighting factors $k_1$, $k_2$, $k_3$ for use by runtime section 11 in enhancing, preserving or, where appropriate, reducing contrasts in runtime images while reducing the bandwidth of multichannel runtime signals.

Calibration locations 31, 32 can be selected by a user, e.g., via a keyboard, mouse or other standard input device of an image processing workstation (not shown). Alternatively, their locations can be predetermined, e.g., where the location of contrasting edges of interest are known a priori. Still further, the calibration locations can be selected automatically using conventional image processing techniques that operate on the combined or individual channel images. For example, in embodiments where the general spectral characteristics of the training image are known, the calibration locations can be identified by conventional image processing edge detection techniques that are applied to find one or more prominent edges in a designated one of the channel images.

In the illustrated embodiment, the weighting factors $k_1$, $k_2$, $k_3$ are generated as a function of the contrast, i.e., the pixel-wise change in intensity, of the respective channel images $C_1$, $C_2$, $C_3$ at respective locations 32a, 32b, 34a, 34b, 36a, 36b. Thus, for example, $k_1$ is generated as a function of the contrast and, more particularly, the change in intensity of channel image $C_1$ per unit distance along an axis, e.g., the x-axis. In this illustrated embodiment, this relationship can be represented by the function:

$$k_1 = \left.\frac{\delta C_1(x)}{\delta x}\right|_{location}$$

where, location represents the pixels in the corresponding regions 32a, 32b of the respective channel image $C_1$.

In this embodiment of the invention, the weighting factors $k_2$ and $k_3$ are likewise generated as a function of the change in intensity of the respective channel images $C_2$, $C_3$ per unit distance along the respective x-axes. These relationships can be represented by the functions:

$$k_2 = \left.\frac{\delta C_2(x)}{\delta x}\right|_{location}$$

$$k_3 = \left.\frac{\delta C_3(x)}{\delta x}\right|_{location}$$

Those skilled in the art will appreciate that weighting factors $k_i$, can be determined as other functions of the values in the channel images at the calibration location(s) as well. For example, the weighting factors can be determined by selecting from a list of predefined weighting factors that causes the best contrast improvement after testing each member of the list.

In embodiments where the runtime section 11 generates reduced-bandwidth runtime signals as a linear function of multichannel runtime signals, the weighting factors $k_i$ can be normalized, e.g., so that they sum to a specified value, e.g., 1. A preferred such relationship for generating normalized weighting factors follows:

$$K_1 = \frac{k_1}{k_1 + k_2 + k_3}$$

$$K_2 = \frac{k_2}{k_1 + k_2 + k_3}$$

$$K_3 = \frac{k_3}{k_1 + k_2 + k_3}$$

where, $k_i$ represents a weighting factor for channel i, and $K_i$ represents a normalized weighting factor for channel i.

Where the calibration location includes only a single edge, e.g., an edge between electrical element 14 and background 16, the channel having the largest weighting factor $k_i$ can be assigned a normalized weighting factor $K_i$ of one and the other channels can be assigned normalized weighting factors of zero.

Those skilled in the art will appreciate that normalized weighting factors $K_i$ can be determined as other functions of the weighting factors $k_i$. For example, normalization can be performed, if at all, by setting $K_i$ to one if $k_i$ is greater than a threshold value and, otherwise, setting $K_i$ to zero. Also, it will be appreciated that the weighting factors $K_i$, $k_i$ can be signed, i.e., they can have positive and negative values.

Clamping can also be performed in addition to or instead of normalization. For eight-bit images, clamping insures that all output values are in the range from 0 to 255. If the value is greater than 255, it is reset to 255. If the value is less than 0, it is reset to 0.

Runtime section 11 utilizes the weighting factors or their normalized counterpart (all collectively referred to as weighting factors, or $k_i$) to reduce the bandwidth of multichannel runtime images acquired by image acquisition device, e.g., so that they can be processed by gray-scale image processing equipment.

Those runtime images are acquired by image acquisition device 38 that, like device 12, may comprise any image acquisition device capable of generating an image signal having channels representing respective (and, possibly, overlapping) spectral components of a scene. In preferred embodiments, image acquisition devices 12 and 38 represent the same device, e.g., an RGB color video camera, that is used to generate both training and runtime image signals.

In the illustrated embodiment, the runtime image represents a scene of showing multiple electrical elements 40a–40f against a background 42, such as a printed circuit board. The runtime image can represent any scene. Preferably, of course, the image is one having contrasting regions similar to those in the training image, though not necessarily in the same locations. Though the runtime image is preferably generated by a conventional image acquisition device, it may also be generated artificially (e.g., via use of computer graphics).

Channels $C_1$–$C_3$, carried on conductors 44a–44c, represent respective spectral components of the runtime image, are routed from image acquisition device 38 to image processing device 46, as shown. Also routed to device 46 are weighting factors $k_i$ generated by training section 10.

As with device 30, discussed above, image processing device 46 may be a general purpose computer, vision processor (e.g., of the type available from the assignee hereof, Cognex Corporation), or special purpose computing device programmed, constructed and/or operated in accord with the teachings that follow to generate weighting factors from the multichannel, multichannel training signal. In a preferred embodiment, image processing devices 30, 46 represent the same device, e.g., a vision processor, that is used to generate both weighting factors and bandwidth-reduced image signals.

Image processing device 46 generates, from a multichannel runtime image, an image of reduced bandwidth. In a preferred embodiment, where the multichannel runtime image is an RGB color video signal (i.e., a three-channel, 24-bit signal), the reduced bandwidth signal is a one-channel, 8-bit, gray-scale image signal. Those skilled in the art will, of course, appreciate that other bandwidth reductions may be accomplished by methods and apparatus according to the invention. For example, the invention can be applied to reduce the bandwidth of a multichannel radar signal.

In the illustrated embodiment, image processing device 46 generates the reduced bandwidth signal via mapping image values of the multichannel signal into the reduced bandwidth signal. One preferred embodiment generates the reduced bandwidth signal as a linear function of the image intensity values in each channel 44A–44C of the runtime image. Weighting factors for that function are those factors $k_i$ generated by the training section 10. One such linear function is represented by the following relationship:

$$I_1 = k_1 C_1 + k_2 C_2 + \ldots k_n C_n$$

where $I_1$ is the reduced bandwidth runtime image signal;

$C_1$–$C_n$ are channels of the multichannel runtime signal; and $k_1$–$k_n$ are weighting factors for the channels $C_1$–$C_n$.

Those skilled in the art will appreciate that the reduced bandwidth runtime image signal can be generated by other linear, as well as non-linear, functions of the multichannel runtime image. Other such functions include $$I_1 = \sqrt[m]{k_1 C_1^m + k_2 C_2^m + K + k_n C_n^m}$$

Where the weighting factors $k_i$ are generated as a function of the change in intensity of the respective training image channels per unit distance along an axis, as discussed above, the reduced bandwidth runtime signal maintains or emphasizes selected contrasts in the multichannel runtime image, to wit, contrasts similar to those represented in the calibration locations of the training image. Thus, in the illustrated embodiment, image processing device 46 generates a reduced bandwidth signal emphasizing contrasts between the electrical component and background. Such a reduced bandwidth signal is illustrated by image 48. As above, the invention does not require that the image 48 be displayed. Typically, for example, it is routed to a gray-scale vision processing tool (such as search, edge finder, contour angle finder, etc.) for analysis.

As evident in the illustration, the contrasts in the reduced bandwidth signal between the component (and its leads) and the background are greater than the corresponding contrasts in the scene from which the runtime image is generated. Those skilled in the art will appreciate that the invention can similarly be used to reduce selected contrasts in the reduced-bandwidth runtime signal.

Figure 2:
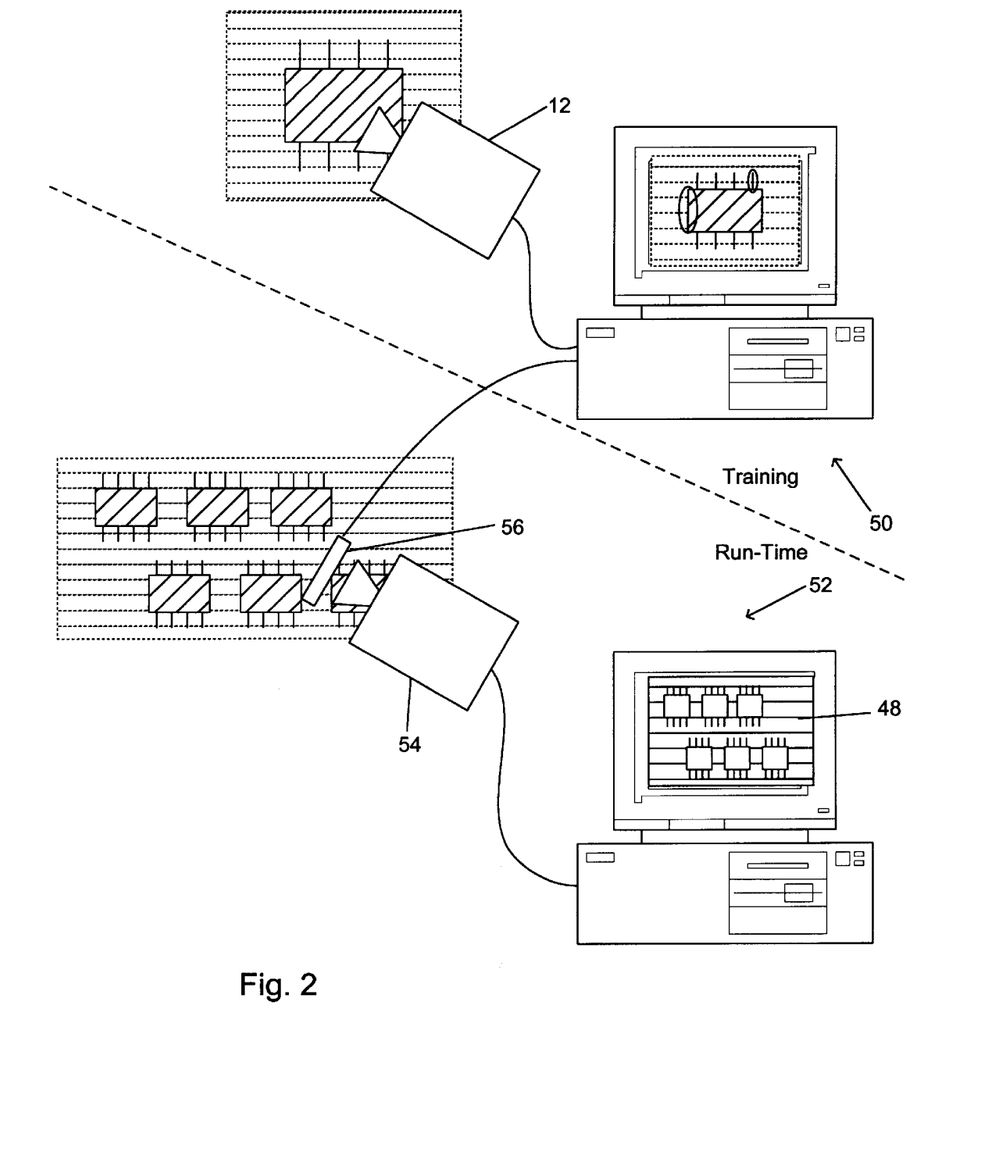
FIG. 2 depicts an optical filter-based machine vision system for bandwidth reduction according to one practice of the invention.

FIG. 2 depicts a system for bandwidth reduction according to an alternate embodiment of the invention. As above, the system includes a training section 50 that acquires a multichannel training image and that generates weighting functions $k_i$ from that image. The system also includes a runtime section 52 that utilizes a weighting factor-controlled optical filter to alter or preserve the spectral content of the runtime scene—and, particularly, to preserve selected contrasts in the reduced-bandwidth form of that scene.

The training section 50 is constructed an operated identically to training section 10, described above.

As above, the runtime section 52 utilizes image acquisition device 54 to acquire an image of a scene that preferably has contrasting regions similar to those in the training image (though, again, not necessarily in the same locations). Image acquisition device 54 acquires a runtime image that is of reduced bandwidth with respect to image acquisition device 12 of training section 50. For example, in the illustrated embodiment, image acquisition device 12 is a conventional RGB color video camera that generates a three-channel, 24-bit, multichannel signal; whereas device 54 is a single-channel, 8-bit, gray-scale camera. Those skilled in the art will appreciate that the teachings herein can be applied to other combinations of image acquisition devices, as well. One such combination, for example, calls for placing the filter in front of the eight-bit gray-scale camera at training time and acquiring a 24-bit multichannel signal by sequentially acquiring three eight-bit images with three different filter settings.

An adjustable optical element 56 filters the image acquired by image acquisition device 54 to alter or preserve selected contrasts in the scene. The filter is any conventional optical quality, adjustable filter element, such as a color LCD filter or an image intensifier. The filter is set using weighting factors $k_i$ generated by the training section 50.

Specifically, the filter 56 is dynamically adjusted, based on the values of the weighting factors $k_i$, so as to alter the spectral content of the acquired image.

As above, the reduced bandwidth runtime image signal generated by image acquisition device 54 maintains or emphasizes selected contrasts in the multichannel runtime image, to wit, contrasts similar to those represented in the calibration locations of the training image. Thus, in the illustrated embodiment, device 54 generates a reduced bandwidth image signal emphasizing contrasts between the electrical component and background. Such a reduced bandwidth signal is illustrated by image 48. As above, the invention does not necessitate display of that image—which typically is simply routed to a gray-scale vision tool.

Those skilled in the art will appreciate that the invention can similarly be used to reduce selected contrasts in the reduced-bandwidth runtime signal.

Figure 3:
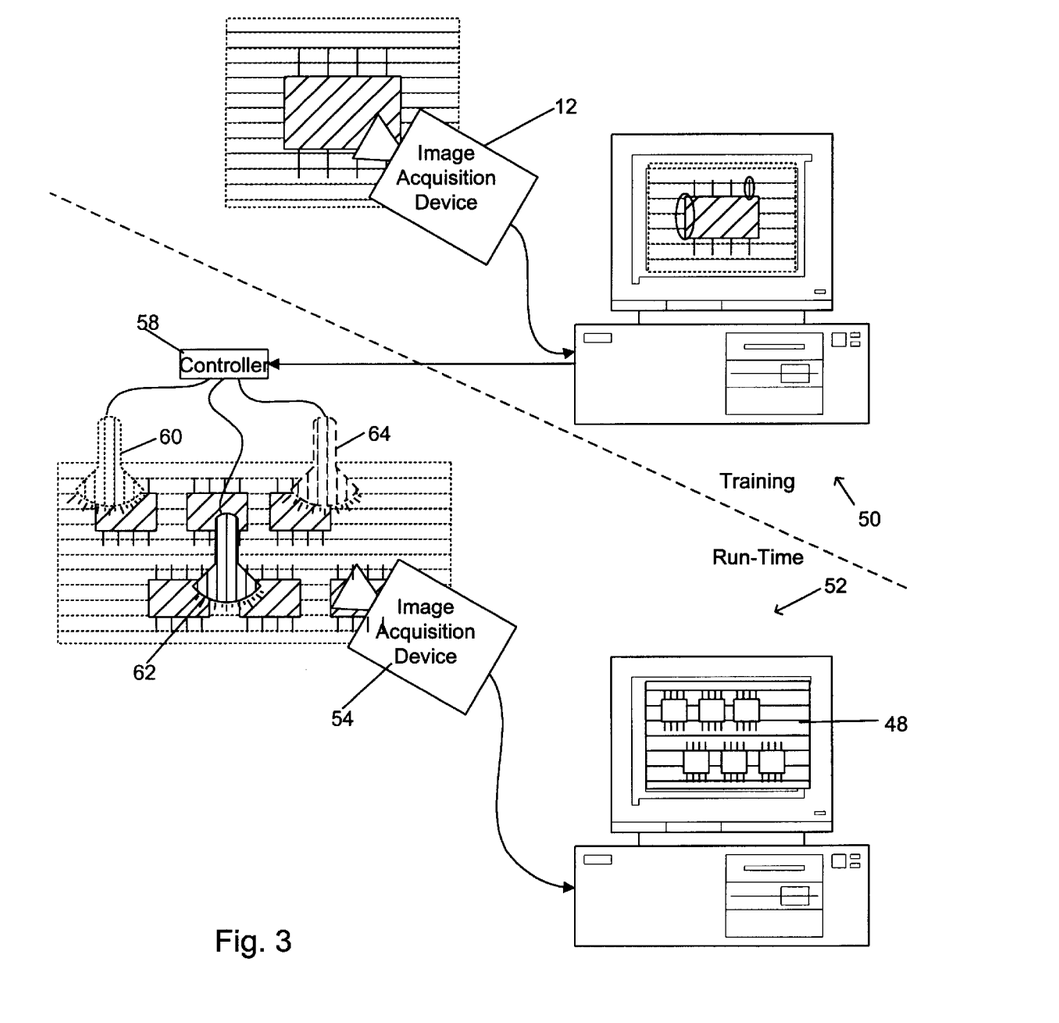
FIG. 3 depicts an illumination-based machine vision system for bandwidth reduction according to one practice of the invention.

FIG. 3 depicts a system for bandwidth reduction according to another alternate embodiment of the invention. The system is constructed and operated identically to the embodiment shown in FIG. 2, except insofar as it utilizes adjustable illumination sources instead of an optical filter to adjust the contrast of the scene imaged by image acquisition device 54.

More particularly, the runtime section 52 of the embodiment illustrated in FIG. 3 utilizes a controller 58 to control illumination intensities of illumination sources 60, 62, 64 in accord with weighting factors $k_i$ generated by training section 50. Those illumination sources, in turn, alter the spectral content of the runtime scene so as to alter or preserve contrasts in the reduce bandwidth image acquired by device 54.

In a preferred embodiment, illumination sources 60, 62, 64 are conventional red, blue and green optical quality lights of the type conventionally used for machine vision illumination. Although three such sources are shown in the illustration, greater or fewer sources that can be controlled in order to alter the spectral content of the runtime scene may also be used. Thus, for example, a single source having an adjustable intensity and/or adjustable spectral output may be substituted for illustrated sources 60, 62, 64.

Controller 58 is operated and constructed in a conventional manner to respond to weighting factors $k_i$, e.g., to vary voltage and/or current applied to illumination sources 60, 62, 64 and, thereby, to control their respective intensities. Specifically, controller 58 dynamically adjusts, based on the values of the weighting factors so as to alter the spectral content of the acquired image.

As above, the reduced bandwidth runtime image signal generated by image acquisition device 54 maintains or emphasizes selected contrasts in the multichannel runtime image, to wit, contrasts similar to those represented in the calibration locations of the training image. Thus, in the illustrated embodiment, device 54 generates a reduced bandwidth image signal emphasizing contrasts between the electrical component and background. Such a reduced bandwidth signal is illustrated by graphic 48. Those skilled in the art will appreciate that the invention can similarly be used to reduce selected contrasts in the reduced-bandwidth runtime signal.

Figure 4:
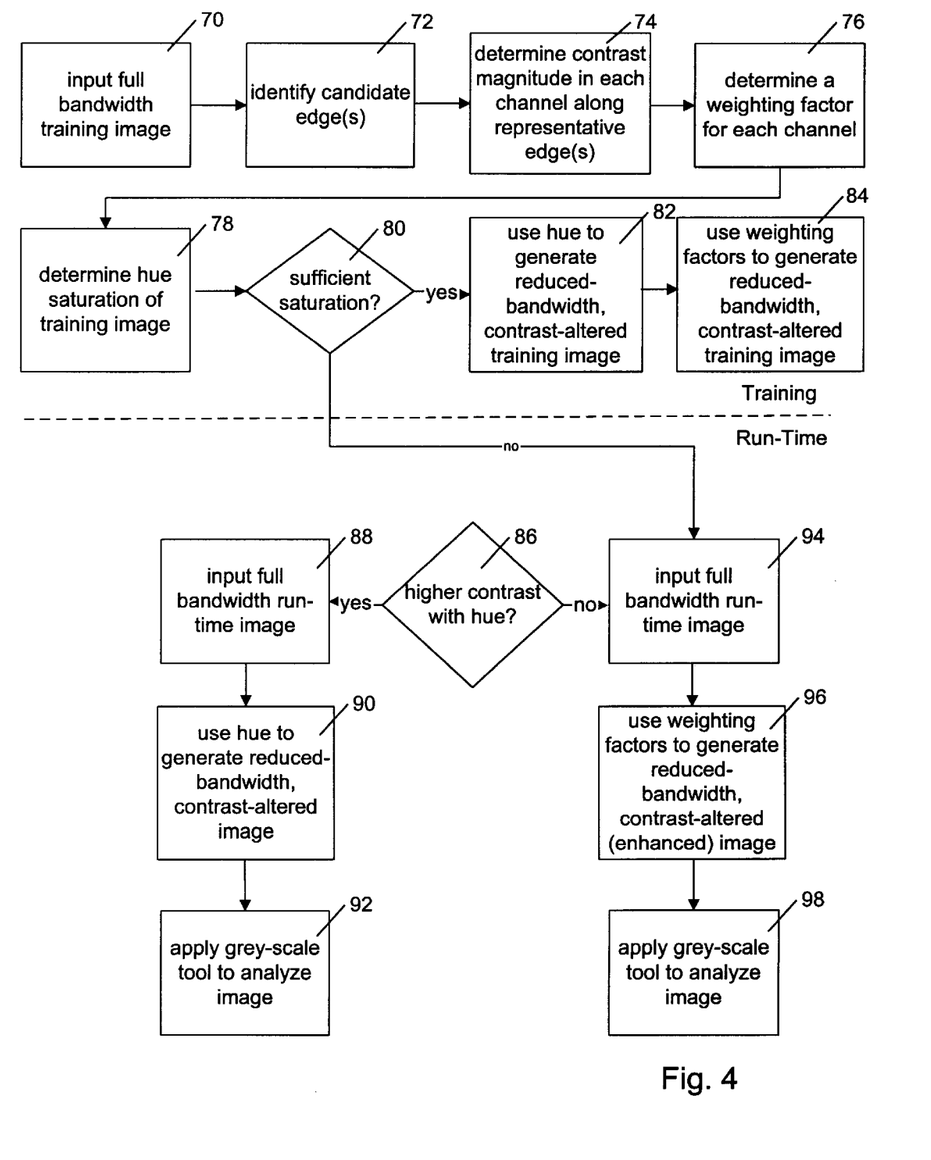
FIG. 4 depicts a methodology for machine vision bandwidth reduction according to one practice of the invention.

FIG. 4 depicts a method for reducing the bandwidth of a multichannel, multichannel image in accord with one practice of the invention. The method incorporates the operations discussed above, in addition to steps for using hue as an alternate technique for bandwidth reduction.

In step 70, the method inputs a training image. This is preferably done in the manner discussed above in connection with FIG. 1.

In step 72, the method identifies calibration locations in the candidate image, again, preferably in the manner discussed above in connection with FIG. 1.

In steps 74–76, the method determines the contrast of each channel image at locations corresponding to the calibration locations and, from those contrasts, it determines weighting factors $k_i$ for each channel. This is preferably done, as discussed above, based on the pixel-wise change in intensity of the respective channel images at locations corresponding to the calibration location(s), in accord with the relationships:

$$k_1 = \left.\frac{\delta C_1(x)}{\delta x}\right|_{location}$$

$$k_2 = \left.\frac{\delta C_2(x)}{\delta x}\right|_{location}$$

$$k_3 = \left.\frac{\delta C_3(x)}{\delta x}\right|_{location}$$

where, location represents the pixels in the corresponding regions of the respective channel image. As above, those skilled in the art will appreciate that weighting factors $k_i$, can be determined as other functions of the values in the channel images at the calibration location (s) as well.

In steps 78–86, the method determines whether an alternate technique for bandwidth reduction—to wit, hue—provides better contrast enhancement than use of weighting factors determined in step 76 (or, in the alternate embodiment discussed below, than use of the look-up table).

Particularly, in step 78, the method determines the hue saturation of the training image. Where the training signal represents a conventional RGB color signal, the hue saturation, S, is preferably determined in accord with the mathematical relationship:

$$S = \sqrt{\frac{1}{6}(2C_1 - C_2 - C_3)^2 + \frac{1}{2}(C_3 - C_2)^2}$$

where, $C_1$ is the red color signal;

$C_2$ is the blue color signal; and $C_3$ is the green color signal.

In step 80, the method determines whether the hue saturation S is sufficient for computation of a viable "hue" image. If the hue saturation is too low, the method proceeds directly to step 94. In the preferred embodiment, the saturation is deemed to be too low if it is less than 40 and, preferably, if it is less than 5–10.

In the event that the hue saturation is not too low, the process proceeds to step 82. In that step, the process generates a hue image from the training image. The hue image is generated in a conventional manner, preferably, in accord with the relationship:

$$x = (2C_1 - C_2 - C_n)\sqrt{\frac{1}{6}}$$

$$y = (C_2 - C_n)\sqrt{\frac{1}{2}}$$

$$I_2 = \operatorname{atan2}(x, y)$$

$$S = \sqrt{x^2 + y^2}$$

where $I_2$ is the hue image;

S is the saturation image; (Both the hue and saturation images may be rescaled to fit in the range from 0–255 for eight-bit images.)

$C_1$–$C_n$ are channel images of the training image; and atan2 is an arctangent function.

Those skilled in the art will appreciate that a hue image generated in this manner is of reduced bandwidth. Thus, for example, where the original image training image is represented by a three-channel, color, RGB-format signal, the hue image can be represented by a single 8-bit signal.

Those skilled in the art will also appreciate that hue and hue saturation can be determined in other ways, as well. These include, by way of non-limiting example, a lookup table storing such values. Moreover, it will be appreciated that techniques for bandwidth reduction may be used in place of hue.

In step 84, the method generates a reduced bandwidth image signal from training signal, using the weighting factors $k_i$. Preferably, that reduced bandwidth signal is generated in the manner discussed above, to wit, as a function of the linear relationship:

$$I_1 = k_1 C_1 + k_2 C_2 + \ldots k_n C_n$$

where $I_1$ is the reduced bandwidth runtime image signal;

$C_1$–$C_n$ are channels of the multichannel runtime signal; and $k_1$–$k_n$ are weighting factors for the channels $C_1$–$C_n$.

As discussed above, other techniques involving both linear and non-linear equations can be used to generate the reduced bandwidth image signal from the weighting factors.

During the runtime phase of operation, the method utilizes either the weighting factors or hue to generate reduced bandwidth images from runtime images. As indicated by step 86, in instances where the hue image generated in step 82 has higher contrast in regions corresponding to the calibrations locations than the reduced bandwidth image generated in step 84, the method jumps to step 88 for utilization of hue to generate reduced bandwidth images from runtime images. Otherwise, it jumps to step 94 for utilization of the weighting factors to generate those reduced bandwidth images.

Particularly, in step 88 of the runtime phase of operation, the method inputs a multichannel, multichannel runtime image, e.g., in the manner discussed above in connection with FIG. 1. In step 90, the method utilizes a hue calculation as discussed in the preceding paragraphs to generate a reduce bandwidth hue image. In optional step 92, the method applies a conventional gray-scale tool to the reduced bandwidth hue image.

In step 94 of the runtime phase, the method inputs a multichannel, multichannel runtime image, e.g., again, in the manner discussed above in connection with FIG. 1. In step 96, the method utilizes the weighting factors $k_i$ (or normalized forms thereof) to generate a reduced bandwidth image signal, e.g., in the manner discussed above in connection with FIG. 1. In optional step 98, the method applies a conventional gray-scale tool to the reduced bandwidth image.

Those skilled in the art will appreciate that techniques other than those discussed above can be used to reduce the bandwidth of the multichannel training and runtime images. For example, in lieu of generating weighting factors, as described above and shown in steps 72–76, an alternate embodiment of the invention generates a look-up table for use in mapping multichannel runtime images into reduced bandwidth images. That look-up table is generated by assigning an eight-bit label to each 24-bit color.

Likewise, in lieu of illustrated steps 84 and 96, the method generates a reduced bandwidth images from the training and runtime signal using the lookup table. Preferably, that reduced bandwidth image is generated by replacing each 24-bit value with the corresponding 8-bit value in the lookup table.

Figure 5:
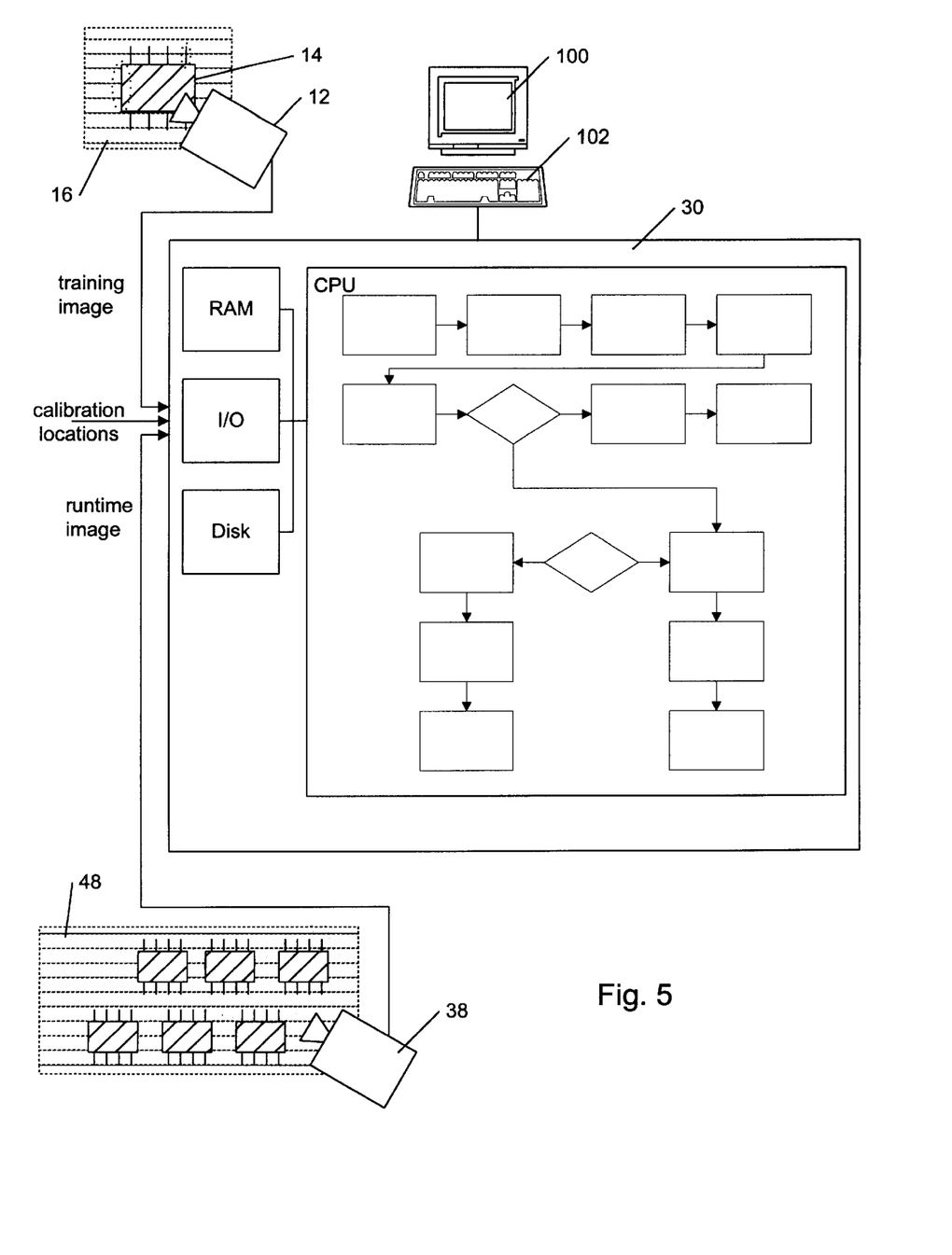
FIG. 5 depicts an apparatus for machine vision bandwidth reduction according to the invention.

FIG. 5 illustrates an apparatus for machine vision bandwidth reduction utilizing the methodology shown in FIG. 4 and discussed above.

As with the device shown in FIG. 1, the apparatus of FIG. 5 includes an image acquisition device 12 that acquires a training image—here, a scene showing an electrical element 14 on a background 16, e.g., a printed circuit board. The device 12 generates a multichannel, multichannel "training" signal, representing that image, and outputs it on conductors that are routed to an input/output (I/O) section of image processing device 30.

In further accord with the apparatus shown in FIG. 1, that shown in FIG. 1 includes an image acquisition device 38 that, like device 12, generates a multichannel runtime image having channels representing respective (and, possibly, overlapping) spectral component of a scene. In the illustrated embodiment, that scene is of multiple electrical elements 40*a*–40*f* against a background 42, such as a printed circuit board. Channels representing respective spectral components of the runtime image are routed from image acquisition device 38 to the I/O section of the image processing device 30.

As noted above, device 30 may be a general purpose computer, vision processor (e.g., of the type available from the assignee hereof, Cognex Corporation), or special purpose computing device programmed, constructed and/or operated in accord with the teachings herein to generate weighting factors from the multichannel, multichannel training signal. In the illustrated embodiment, device 30 is shown to be a general purpose computer of the type including a central processing unit (labeled "CPU"), a memory unit (labeled "RAM"), and input/output unit (labeled "I/O"), all of which are constructed, interconnected and operated in the conventional manner. The device 30 is also connected to a monitor 100 or other output device, such as a printer (not shown), as well as to input devices, such as keyboard 102 and mouse (not shown), e.g., by which a user can monitor and control operation of the device 30. Such input devices can also be used, by way of example, to specify calibration locations for use in processing the training image as discussed above.

Illustrated device 30 is programmed in a conventional manner to operate in accord with the methodology shown in FIG. 4 and discussed above to reduce the bandwidth of multichannel, multichannel runtime images. As more particularly indicated by the flow-chart outline within the illustrated CPU, that element is configured by such programming to execute steps 70–98, discussed above, and thereby to serve as means for providing that functionality.

Figures 6, 6B:
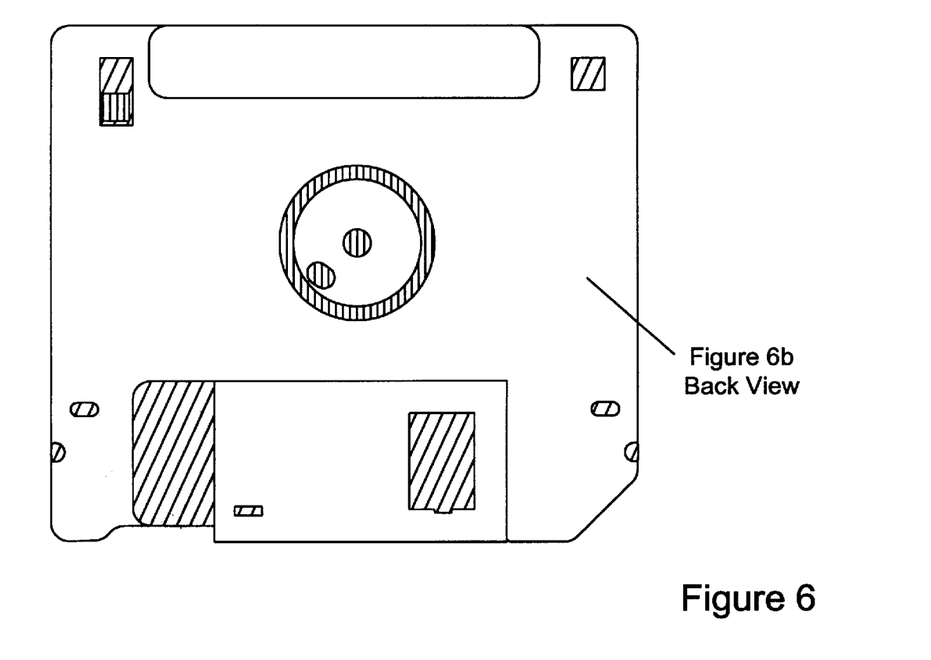
FIG. 6 depicts an article of manufacture embodying a computer program for causing a digital data processing apparatus to operate in accord with methods according to the invention.
Figure 6A:
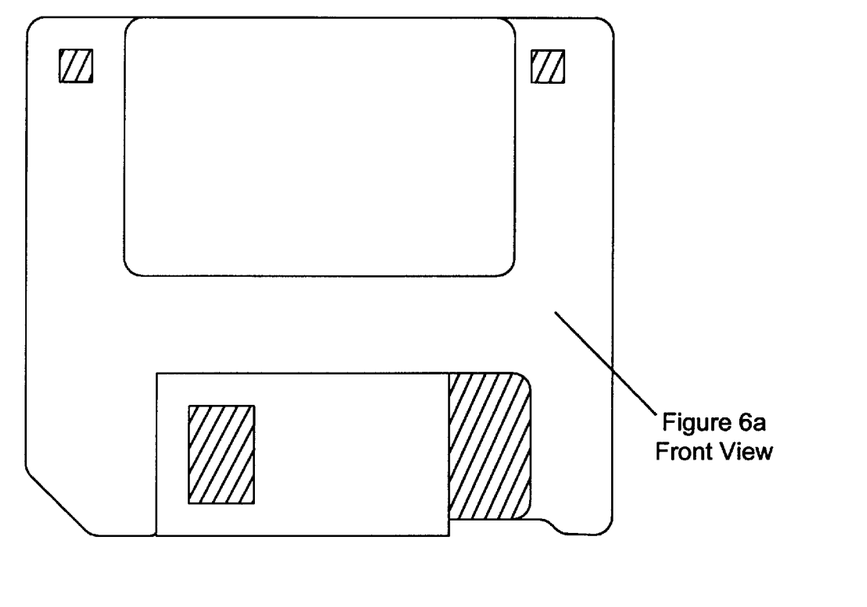

FIG. 6 depicts an article of manufacture, to wit, a magnetic diskette, composed of a computer usable media, to wit, a magnetic disk, embodying a computer program that causes device 30, or other such digital data processing apparatus, to operate in accord with the methods described above in connection with FIGS. 1–5. The diskette is shown in front view and back view. It is of conventional construction and has the computer program stored on the magnetic media therein in a conventional manner readable, e.g., via a read/write head contained in a diskette drive of apparatus 30. It will be appreciated that diskette is shown by way of example only and that other articles of manufacture comprising computer usable media on which programs intended to cause a computer to execute in accord with the teachings hereof are also embraced by the invention.

Described above are apparatus and methods meeting the objects set forth herein. Those skilled in the art will appreciate that the specific embodiments illustrated in the drawings and described above are illustrative only, and that other embodiments incorporating modifications thereto fall within the scope of the invention. Thus, for example, whereas the illustrated embodiments are utilized to reduce a conventional color image to a gray-scale image, the invention can likewise be applied to reduce the bandwidth of other images. Moreover, whereas the illustrated embodiments are shown as acquiring multichannel training and runtime images over multiple conductor sets (e.g., conductors 18, 20, 22 of FIG. 1), such multichannel images can be received over a single conductor set or in a single stream of digital words (e.g., as in the case of a 24-bit color image).

In view of the foregoing, what we claim is:

1. A method of reducing bandwidth of a multichannel image that has multiple channels each representing a respective spectral component of a scene, the method comprising the steps of:

A. identifying a calibration location in a multichannel training image;

B. determining a contrast within each channel of the multichannel training image at a location corresponding to the calibration location;

C. determining a weighting factor for each channel of the multichannel training image as a function of the contrast within the channel at the location corresponding to the calibration location; and D. generating, from a multichannel runtime image, a first reduced bandwidth runtime image but that has fewer channels than the multichannel runtime image, the reduced bandwidth runtime image being generated as a first function of (i) the multichannel runtime image, and (ii) the weighting factors for the channels of the multichannel training image.

2. A method according to claim 1, wherein step (C) includes the step of generating the weighting factors so as to emphasize a contrast at the calibration location in the training image.

3. A method according to claim 2, wherein the first function utilized in step (D) is a linear function of (i) the channels of the multichannel runtime image, and (ii) the weighting factors for each channel of the multichannel training image.

4. A method of reducing bandwidth of a multichannel image that has multiple channels each representing a respective spectral component of a scene, the method comprising the steps of:

A. identifying a calibration location in a multichannel training image;

B. determining a contrast within each channel of the multichannel training image at a location corresponding to the calibration location;

C. determining a weighting factor for each channel of the multichannel training image as a function of the contrast within the channel at the location corresponding to the calibration location; said weighting factors being generated so as to emphasize a contrast at the calibration location in the training image; and D. generating, from a multichannel runtime image, a first reduced bandwidth runtime image but that has fewer channels than the multichannel runtime image, the reduced bandwidth runtime image being generated as a first function of (i) the multichannel runtime image, and (ii) the weighting factors for the channels of the multichannel training image, wherein the first function utilized in step (D) is represented by the following relationship:

$I_1 = k_1C_1 + K_2C_2 + \ldots K_nC_n$ where
$I_1$ is the first reduced bandwidth runtime image;
$C_1$–Cn are channels of the multichannel runtime image; and
$k_1$–kn are weighting factors for the channel $C_1$–$C_n$.

5. A method according to claim 4, wherein step (C) includes the step of determining the weighting factors so that, together, their sum is a selected value.

6. A method according to claim 5, wherein step (C) includes the step of determining the weighting factors so that, together, their sum is substantially one.

7. A method for reducing bandwidth of a multichannel image that has multiple channels each representing a respective spectral component of a scene, the method comprising the steps of:
A. identifying a calibration location in a multichannel training image;
B. determining a contrast within each channel of the multichannel training image at a location corresponding to the calibration location;
C. determining a weighting factor for each channel of the multichannel training image as a function of the contrast within the channel at the location corresponding to the calibration location; and
D. generating, from a multichannel runtime image, a first reduced bandwidth runtime image but that has fewer channels than the multichannel runtime image, the reduced bandwidth runtime image being generated as a first function of (i) the multichannel runtime image, and (ii) the weighting factors for the channels of the multichannel training image, said first function being a linear function of (i) the channels of the multichannel runtime image, and (ii) the weighting factors for each channel of the multichannel training image,
wherein step (C) further includes the steps of:
generating, from the multichannel training image, a first reduced bandwidth training image, the first reduced bandwidth training image being generated using the first function;
generating, from the multichannel training image, a second reduced bandwidth training image, the second reduced training image being generated using a second function that differs from the first function;
comparing a contrast at the calibration location in the first reduced bandwidth training image with that at the calibration location in the second reduced bandwidth training image; and
utilizing, in step (D) a selected one of the first and second functions, based on a result of the comparing step.

8. A method according to claim 7, wherein the second function is a hue function.

9. A method according to claim 8, comprising the step of determining a hue saturation in the multichannel training image and, depending on a degree of hue saturation, generating the second reduced bandwidth image as function of a hue of the corresponding multichannel image.

10. A method according to claim 9, wherein the second function is represented by the relationship:

$$x = (2C_1 - C_2 - C_n)\sqrt{\frac{1}{6}}$$

$$y = (C_2 - C_n)\sqrt{\frac{1}{2}}$$

$I_2 = a \tan 2(x,y)$ where
$I_2$ is the second reduced bandwidth image;
$C_1$–$C_n$ are channels of the multichannel image from which the first reduced bandwidth image is generated; and
atan2 is an arctangent function.

11. A method of bandwidth reduction for machine vision image acquisition, the method comprising the steps of:
A. identifying a calibration location in a multichannel training image that has multiple channels, each representing a respective spectral component of a training scene;
B. determining a contrast within each channel of the multichannel training image at a location corresponding to the calibration location;
C. determining a weighting factor for each channel of the multichannel training image as a function of the contrast within that channel at the location corresponding to the calibration location; and
D. adjusting an optical element to alter a spectral content of a runtime scene and inputting an image of that scene with a second image acquisition device that represents the image with fewer channels than the multichannel training image.

12. A method according to claim 11, wherein the optical element is an optical filter that alters a spectral content of the image acquired by the second image acquisition device.

13. A method according to claim 12, wherein the optical element is an illumination source that alters a spectral content of the image acquired by the second image acquisition device.

14. A method according to any of claims 12 and 13 wherein the step (D) includes the step of imaging the runtime scene with a second image acquisition device that acquires a gray-scale image.

15. A method according to any of claims 12 and 13, wherein step (D) includes the step of imaging the runtime scene with a second image acquisition device that acquires a gray-scale image.

16. A machine vision method of analyzing, with a gray-scale machine vision tool, a multichannel image that has multiple channels, each representing a respective spectral component of a scene, the method comprising the steps of:
A. determining, from a multichannel training image representing a training scene, a mapping function;
B. generating, from a multichannel runtime image representing a runtime scene, a reduced bandwidth runtime image that represents the runtime scene but that has fewer channels than the multichannel runtime image, the reduced bandwidth runtime image being generated as a function of (i) the multichannel runtime image, and (ii) the mapping function; and
C. applying the reduced bandwidth runtime image to the gray-scale machine vision tool.

17. A method according to claim 16, wherein step (A) includes the steps of identifying a calibration location in a multichannel training image representing a training scene;

determining a contrast within each channel of the multichannel training image at a location corresponding to the calibration location; and determining a weighting factor for each channel of the multichannel training image as a function of the contrast within that channel at the location corresponding to the calibration location.

18. A method according to claim 17, wherein step (B) includes the step of generating the reduced bandwidth runtime image as a function of (i) the multichannel runtime image, and (ii) the weighting factors for the channels of the multichannel training image.

19. A method according to claim 16, wherein step (A) includes the steps of identifying one or more calibration locations in a multichannel training image representing a training scene;

generating a look-up table as a function of the image values in one or more of the channels of the multichannel training image at each of the calibration locations.

20. A method according to claim 19, wherein step (B) includes the step of generating at least selected image values in the reduced bandwidth runtime image as a function of (i) corresponding image values in the multichannel runtime image, and (ii) corresponding values in the look-up table.

21. An article of manufacture comprising a computer usable medium embodying program code for causing a digital data processor to carry out a method of reducing bandwidth of a multichannel image that has multiple channels each representing a respective spectral component of a scene, the method comprising the steps of:

A. identifying a calibration location in a multichannel training image representing a training scene;

B. determining a contrast within each channel of the multichannel training image at a location corresponding to the calibration location;

C. determining a weighting factor for each channel of the multichannel training image as a function of the contrast within the channel at the location corresponding to the calibration location; and D. generating, from a multichannel runtime image representing a runtime scene, a first reduced bandwidth runtime image but that has fewer channels than the multichannel runtime image, the reduced bandwidth runtime image being generated as a first function of (i) the multichannel runtime image, and (ii) the weighting factors for the channels of the multichannel training image.

22. An article of manufacture according to claim 21, wherein step (C) of the method includes the step of generating the weighting factors so as to emphasize a contrast at the calibration location in the training image.

23. An article of manufacture comprising a computer usable medium embodying program code for causing a digital data processor to carry out a method of bandwidth reduction for machine vision image acquisition, the method comprising the steps of:

A. inputting with a first image acquisition device a multichannel training image representing a training scene and having multiple channels that each represent a respective spectral component of the training scene;

B. identifying a calibration location in the multichannel training image;

C. determining a contrast within each channel of the multichannel training image at a location corresponding to the calibration location;

D. determining a weighting factor for each channel of the multichannel training image as a function of the contrast within that channel at the location corresponding to the calibration location;

E. adjusting an optical element to alter a spectral content of a runtime scene and inputting an image with a second image acquisition device that represents that scene with a reduced bandwidth signal having fewer channels than the multichannel training image.

24. An article of manufacture according to claim 23, wherein the optical element is an optical filter that alters a spectral content of the image acquired by the second image acquisition device.

25. An article of manufacture comprising a computer usable medium embodying program code for causing a digital data processor to carry out a method of analyzing with a gray-scale machine vision tool a multichannel image that represents a scene and that has multiple channels each representing a respective spectral component of the scene, the method comprising the steps of:

A. determining, from a multichannel training image representing a training scene, a mapping function;

B. generating, from a multichannel runtime image representing a runtime scene, a reduced bandwidth runtime image but that has fewer channels than the multichannel runtime image, the reduced bandwidth runtime image being generated as a function of (i) the multichannel runtime image, and (ii) the mapping function; and C. applying the reduced bandwidth runtime image to the gray-scale machine vision tool.

26. An article of manufacture according to claim 25, wherein step (A) of the method includes the steps of identifying a calibration location in a multichannel training image representing a training scene;

determining a contrast within each channel of the multichannel training image at a location corresponding to the calibration location; and determining a weighting factor for each channel of the multichannel training image as a function of the contrast within the channel at the location corresponding to the calibration location.

27. An article of manufacture according to claim 25, wherein step (A) of the method includes the steps of identifying one or more calibration locations in a multichannel training image representing a training scene;

generating a look-up table as a function of the image values in one or more of the channels of the multichannel training image at each of the calibration locations.

28. An apparatus for reducing bandwidth of a multichannel image that represents a scene and that has multiple channels each representing a respective spectral component of the scene, the apparatus comprising:

A. means for identifying a calibration location in a multichannel training image representing a training scene;

B. means for determining a contrast within each channel of the multichannel training image at a location corresponding to the calibration location;

C. means for determining a weighting factor for each channel of the multichannel training image as a function of the contrast within the channel at the location corresponding to the calibration location; and D. means for generating, from a multichannel runtime image representing a runtime scene, a first reduced bandwidth runtime image runtime scene but that has fewer channels than the multichannel runtime image, the reduced bandwidth runtime image being generated as a first function of (i) the multichannel runtime image, and (ii) the weighting factors for the channels of the multichannel training image.

29. An apparatus according to claim 28, wherein the means for determining generates the weighting factors so as to emphasize a contrast at the calibration location in the training image.

30. An apparatus for reducing the bandwidth of a runtime image based on analysis of a training image, the apparatus comprising:

A. means for identifying a calibration location in a multichannel training image having multiple channels that each represent a respective spectral component of a training scene;

B. means for determining a contrast within each channel of the multichannel training image at a location corresponding to the calibration location;

C. means for determining a weighting factor for each channel of the multichannel training image as a function of the contrast within that channel at the location corresponding to the calibration location;

D. means for adjusting an optical element to alter a spectral content of a runtime scene and inputting that image with a second image acquisition device that represents that scene with a reduced bandwidth image having fewer channels than the multichannel training image.

31. An apparatus according to claim 30, wherein the optical element is an optical filter that alters a spectral content of the image acquired by the second image acquisition device.

32. A machine vision apparatus for analyzing with a gray-scale machine vision tool a multichannel signal that represents a scene and that has multiple channels each representing a respective spectral component of the scene, the method comprising the steps of:

A. means for determining, from a multichannel training image representing a training scene, a mapping function;

B. means for generating, from a multichannel runtime image representing a runtime scene, a reduced bandwidth runtime that represents the runtime scene but that has fewer channels than the multichannel runtime image, the reduced bandwidth runtime image being generated as a function of (i) the multichannel runtime image, and (ii) the mapping function; and C. means for applying the reduced bandwidth runtime image to the gray-scale machine vision tool.

33. An apparatus according to claim 32, wherein the means for determining includes means for identifying a calibration location in a multichannel runtime image representing a training scene;

means for determining a contrast within each channel of the multichannel training image at a location corresponding to the calibration location; and means for determining a weighting factor for each channel of the multichannel training image as a function of the contrast within the channel at the location corresponding to the calibration location.

34. An apparatus according to claim 32, wherein the means for determining includes means for identifying one or more calibration locations in a multichannel training image representing a training scene;

means for generating a look-up table as a function of the image values in one or more of the channels of the multichannel training image at each of the calibration locations.

\* \* \* \* \*